United States Patent
Okuyama et al.

(10) Patent No.: US 10,934,048 B2
(45) Date of Patent: Mar. 2, 2021

(54) SYNTHETIC RESIN CONTAINER AND METHOD FOR MANUFACTURING THE SAME

(71) Applicants: Yuichi Okuyama, Tokyo (JP); Mitsuru Shiokawa, Tokyo (JP)

(72) Inventors: Yuichi Okuyama, Tokyo (JP); Mitsuru Shiokawa, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 291 days.

(21) Appl. No.: 15/756,458

(22) PCT Filed: Jul. 15, 2016

(86) PCT No.: PCT/JP2016/003357
§ 371 (c)(1),
(2) Date: Feb. 28, 2018

(87) PCT Pub. No.: WO2017/037993
PCT Pub. Date: Mar. 9, 2017

(65) Prior Publication Data
US 2018/0265242 A1    Sep. 20, 2018

(30) Foreign Application Priority Data
Aug. 28, 2015 (JP) .............................. JP2015-169522

(51) Int. Cl.
*B65D 1/02*   (2006.01)
*B29C 49/08*  (2006.01)
(Continued)

(52) U.S. Cl.
CPC ............ *B65D 1/0223* (2013.01); *B29C 49/08* (2013.01); *B29C 49/78* (2013.01); *B29C 49/783* (2013.01);
(Continued)

(58) Field of Classification Search
CPC ....... B29C 49/46; B29C 49/08; B65D 1/0207; B65D 1/0223
See application file for complete search history.

(56) References Cited

U.S. PATENT DOCUMENTS

| 4,497,855 A | * | 2/1985 | Agrawal | ................. E04G 21/16 |
| | | | | 215/373 |
| 2005/0140036 A1 | * | 6/2005 | Hirota | .................... B29C 49/18 |
| | | | | 264/40.1 |

(Continued)

FOREIGN PATENT DOCUMENTS

| CN | 101553353 A | 10/2009 |
| CN | 104684708 A | 6/2015 |

(Continued)

OTHER PUBLICATIONS

Oct. 15, 2019 Office Action issued in Chinese Patent Application No. 201680050066.9.

(Continued)

*Primary Examiner* — Andrew T Kirsch
(74) *Attorney, Agent, or Firm* — Oliff PLC

(57) ABSTRACT

A synthetic resin container that is formed in a bottle shape having a mouth and a trunk and that is provided in the trunk with at least one reduced pressure absorbing panel. The trunk has a density of 1.3695 g/cm³ or more, and a ratio of a crystal orientation in a transverse direction with respect to a total value of a crystal orientation in a machine direction and the crystal orientation in the transverse direction in the trunk is less than 44%.

17 Claims, 1 Drawing Sheet

(51) Int. Cl.
B29C 49/46 (2006.01)
B65D 1/00 (2006.01)
B29C 49/78 (2006.01)
B29C 49/06 (2006.01)
B29C 49/00 (2006.01)
B29K 67/00 (2006.01)
B29L 31/00 (2006.01)

(52) U.S. Cl.
CPC .............. B29C 49/786 (2013.01); B65D 1/00 (2013.01); B65D 1/02 (2013.01); B65D 1/0207 (2013.01); B29C 49/0005 (2013.01); B29C 49/06 (2013.01); B29C 2049/4664 (2013.01); B29K 2067/003 (2013.01); B29L 2031/7158 (2013.01); B65D 2501/0027 (2013.01); Y02P 70/10 (2015.11)

(56) References Cited

U.S. PATENT DOCUMENTS

| | | | |
|---|---|---|---|
| 2012/0315350 A1* | 12/2012 | Andison | B29C 49/46 425/524 |
| 2013/0147097 A1 | 6/2013 | Lane et al. | |
| 2017/0100873 A1 | 4/2017 | Tabata et al. | |

FOREIGN PATENT DOCUMENTS

| | | |
|---|---|---|
| JP | 2006-117289 A | 5/2006 |
| JP | 2007-119016 A | 5/2007 |
| JP | 2014-069441 A | 4/2014 |
| JP | 2014-121852 A | 7/2014 |
| JP | 2015-030486 A | 2/2015 |
| WO | 96/13436 A1 | 5/1996 |
| WO | 2008/044793 A1 | 4/2008 |
| WO | 2015/079627 A1 | 6/2015 |

OTHER PUBLICATIONS

Anonymous, Abstract of "Study of the Molecular Structure of PET Films Obtained by an Inverse Stretching Process Part 2: Crystalline Reorganization During Longitudinal Drawing, Polymer, vol. 40," XP055568338. Retrieved from the Internet: URL: https://www.sciencedirect.com/science/article/pii/S0032386198001992 [retrieved on Mar. 13, 2019].
Mar. 21, 2019 Extended Search Report issued in European Patent Application No. 16841037.1.
Mar. 26, 2019 Office Action issued in Japanese Patent Application No. 2015-169522.
Jun. 5, 2019 Office Action issued in Chinese Patent Application No. 201680050066.9.
Oct. 4, 2016 International Search Report issued in International Patent Application No. PCT/JP2016/003357.
Oct. 4, 2016 Written Opinion of the International Searching Authority issued in International Patent Application No. PCT/JP2016/003357.
Nov. 16, 2018 Office Action issued in Chinese Patent Application No. 201680050066.9.
Oct. 30, 2020 Office Action issued in European Patent Application No. 16841037.1.
"Polyethylene terephthalate." Wikipedia. Edited Aug. 17, 2014, Retrieved Oct. 4, 2019, pp. 1-16, url: https://en.wikipedia.org/w/index.php?title=Polyethylene_terephthalate&oldid=621669260.

* cited by examiner

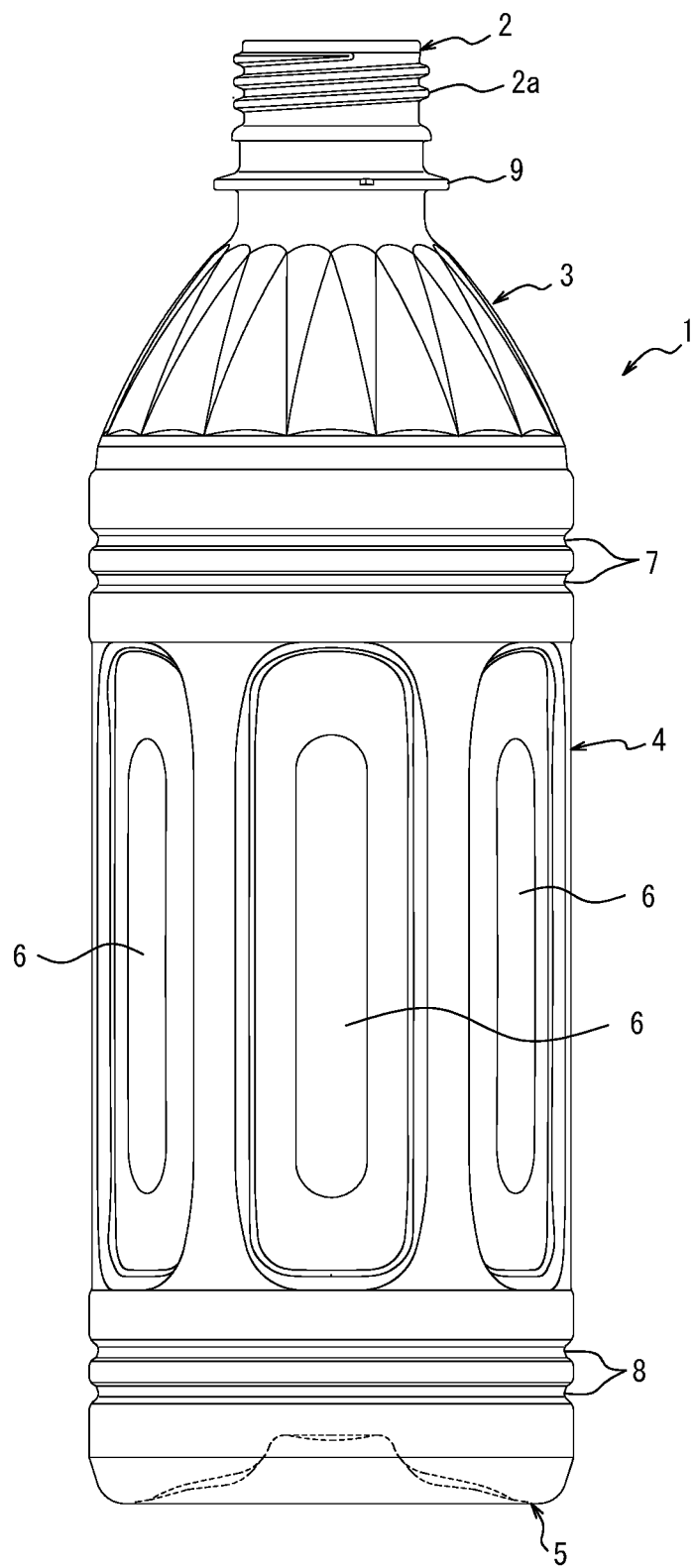

SYNTHETIC RESIN CONTAINER AND METHOD FOR MANUFACTURING THE SAME

TECHNICAL FIELD

The present disclosure relates to a synthetic resin container that is formed in a bottle shape having a mouth and a trunk and that is provided in the trunk with reduced pressure absorbing panels, and the present disclosure also relates to a method for manufacturing the same.

BACKGROUND

Synthetic resin containers (e.g., PET bottles) formed of synthetic resin materials in bottle shapes having mouths and trunks have been used as containers containing beverages, such as juice drinks and tea.

To use such a synthetic resin container (hereinafter, may be simply called the "container") for the purpose of containing a beverage, such as a juice drink, it is necessary to sterilize the content liquid. Accordingly, the content liquid is generally filled to the container according to a so-called hot filling method of filling the content liquid to the container in the state where the content liquid is heated to a predetermined temperature (e.g., 85° C. or more). When, for example, the container is molded by air blow molding, the content liquid heated to the predetermined temperature is filled into the container after molding of the container. Then after the filling, a cap is fitted to the mouth, and subsequently, the container is cooled to room temperature in a cooling process.

However, when the container hot-filled with the content liquid is cooled, the volumes of the content liquid and air within the container are decreased at the time of the cooling. Consequently, the container is placed under a reduced pressure, and the trunk may undergo depression and deformation. To address the above, the container used for a purpose involving hot filling is provided, in the trunk thereof, with reduced pressure absorbing panels that are configured to be deformed to absorb the reduced pressure generated within the container, thereby preventing depression and deformation of the trunk (refer, for example, to Patent Literature 1).

There is another method for forming the container, namely, the method (which is called a liquid blow molding method) of blow molding the container by using a liquid. In a case where the content liquid is filled into the container while the container is molded according to the liquid blow molding method, the liquid heated to a predetermined temperature is supplied to a preform at a predetermined temperature. By doing so, the preform is molded by the liquid into the container having a predetermined shape, and the sterilized content liquid is filled into the container at the same time.

CITATION LIST

Patent Literature

PTL1: JP2015030486A

SUMMARY

Technical Problem

However, the container formed by conventional air blow molding and the container formed by liquid blow molding sometimes exhibit different deformation behaviors at the time of the cooling. This poses the problem that, even when the reduced pressure absorbing panels are provided in the trunk of the container formed by liquid blow molding, the deformation of the trunk cannot sometimes be reduced sufficiently, for example, such that the deformation of the trunk is not uniform in the circumferential direction.

The present disclosure has been conceived in view of the above problem, and the present disclosure is to provide a synthetic resin container that sufficiently reduces the deformation of the trunk under the reduced pressure even in the case where the content liquid is hot-filled by liquid blow molding and a method for manufacturing the same.

Solution to Problem

One of aspects of the present disclosure resides in a synthetic resin container that is formed in a bottle shape having a mouth and a trunk and that is provided in the trunk with at least one reduced pressure absorbing panel. The trunk has a density of 1.3695 $g/cm^3$ or more, and a ratio of a crystal orientation in a transverse direction with respect to a total value of a crystal orientation in a machine direction and the crystal orientation in the transverse direction in the trunk is less than 44%.

In one of preferred embodiments of the synthetic resin container according to the present disclosure, the trunk has a substantially circular section.

In another preferred embodiment of the synthetic resin container according to the present disclosure, the at least one reduced pressure absorbing panel provided in the trunk comprises six reduced pressure absorbing panels arranged in a circumferential direction at an equal interval.

In yet another preferred embodiment of the synthetic resin container according to the present disclosure, the synthetic resin container is formed of polyethylene terephthalate.

Another aspect of the present disclosure resides in a method for manufacturing the synthetic resin container described above, the method including supplying a liquid heated to a predetermined temperature to a preform formed of a thermoplastic material in a bottomed tubular shape at a predetermined pressure to liquid blow mold the preform.

Advantageous Effect

The present disclosure provides a synthetic resin container that sufficiently reduces the deformation of the trunk under the reduced pressure even in the case where the content liquid is hot-filled by liquid blow molding and a method for manufacturing the same.

BRIEF DESCRIPTION OF THE DRAWING

In the accompanying drawing,

FIG. 1 is a front view illustrating an example of a synthetic resin container according to one of embodiments of the present disclosure.

DETAILED DESCRIPTION

A synthetic resin container according to one of embodiments of the present disclosure will be described in more detail below by illustration with reference to the drawing.

The synthetic resin container according to the present disclosure is formed in a bottle shape having a mouth and a trunk and is provided in the trunk with at least one reduced pressure absorbing panel, wherein the trunk has a density of 1.3695 g/cm³ or more, and a ratio of a crystal orientation in a transverse direction with respect to a total value of a crystal orientation in a machine direction and the crystal orientation in the transverse direction in the trunk is less than 44%. FIG. 1 illustrates a synthetic resin container 1 according to one of embodiments of the present disclosure.

The synthetic resin container 1 of FIG. 1 may be used for the purpose of containing a beverage, such as a juice drink and tea, and the synthetic resin container 1 has a bottle shape having a cylindrical mouth 2, a trunk 4, which is connected to the mouth 2 via a shoulder 3, and a bottom 5, which closes a lower end of the trunk 4.

The trunk 4 has a substantially circular section, that is, has a substantially cylindrical shape, and the shoulder 3, which connects the trunk 4 to the mouth 2, is formed in a substantially dome shape.

In the trunk 4, six reduced pressure absorbing panels 6 are arranged in the circumferential direction at an equal interval. Although the FIGURE illustrates only three of the reduced pressure absorbing panels 6, the other three reduced pressure absorbing panels 6 are similarly arranged on the back of the trunk 4.

These reduced pressure absorbing panels 6 are each formed in a substantially rectangular shape extending in the longitudinal direction (in the vertical direction in the FIGURE) and depressed toward the inner side of the trunk 4 with respect to an outer circumferential surface of the trunk 4. The reduced pressure absorbing panels 6 are also configured to reduce inappropriate deformation of the trunk 4 when a liquid (content liquid) is cooled in the state where the mouth 2 is closed by a cap after filling of the liquid and a reduced pressure is generated within the synthetic resin container 1 accordingly, by being deformed more preferentially than other portions of the trunk 4 and absorbing the reduced pressure.

Additionally, the reduced pressure absorbing panels 6 do not necessarily need to be configured as above and only need to absorb the reduced pressure when the reduced pressure is generated within the synthetic resin container 1. The shape, number, arrangement, or the like of the reduced pressure absorbing panels 6 may be altered in various ways. Especially, the reduced pressure absorbing panels 6 may be configured not to be deformed to bulge towards the outer side of the trunk 4 in the radial direction even when the liquid is filled into the synthetic resin container 1. That is to say, although in a container formed by air blow molding the reduced pressure absorbing panels are generally configured to be deformed to bulge when the content liquid is filled to improve the effect of reducing the reduced pressure, in a container formed by liquid blow molding the reduced pressure absorbing panels are not deformed to bulge when the content liquid is filled since the filling of the content liquid and molding of the container are performed at the same time. Accordingly, a container formed by liquid blow molding may adopt simply configured reduced pressure absorbing panels that are not deformed to bulge.

Between the shoulder 3 and the trunk 4, two upper annular concave ribs 7 are arranged vertically side by side to reinforce the trunk 4 and to prevent the progress of the deformation of the reduced pressure absorbing panels 6 towards the shoulder 3. Similarly, between the trunk 4 and the bottom 5, two lower annular concave ribs 8 are arranged vertically side by side to reinforce the trunk 4 and to prevent the progress of the deformation of the reduced pressure absorbing panels 6 towards the bottom 5. Furthermore, a neck ring 9 is disposed integrally in a lower portion of the mouth 2.

The mouth 2 is configured to be fitted with the cap (which is not illustrated) to close the mouth 2. In the illustrated case, the mouth 2 is provided, on an outer circumferential surface thereof, with a screw thread 2a, to which the cap may be screw-connected to close the mouth 2. Additionally, instead of the screw thread 2a, an annular protrusion may be provided in the mouth 2, and a cap having an undercut shape may be fixed to the mouth 2 by plugging.

The synthetic resin container 1 may be formed of polyethylene terephthalate (PET). That is to say, the synthetic resin container 1 may be formed as a pet bottle.

The synthetic resin container 1 may be manufactured by a method for manufacturing a synthetic resin container according to one of embodiments of the present disclosure, that is, by liquid blow molding a preform (which is not illustrated) formed of a thermoplastic resin in a bottomed tubular shape (a substantially test-tube shape). In more detail, the synthetic resin container 1 may be manufactured by heating the preform formed of the thermoplastic resin in the bottomed tubular shape to a predetermined temperature at which stretchability is achieved and by supplying the liquid heated to a predetermined temperature to the heated preform at a predetermined pressure. In this case, as the liquid used as a pressurizing medium during liquid blow molding, the content liquid, such as a beverage, that is to be contained in the synthetic resin container 1 as a final product may be used. By doing so, the process of filling the content liquid to the synthetic resin container 1 after molding may be omitted, and the manufacturing process and the configuration of the manufacturing apparatus may be simplified.

The trunk 4 of the synthetic resin container 1 has a density of 1.3695 g/cm³ or more, and a ratio of a crystal orientation in the transverse direction (TD) with respect to a total value of a crystal orientation in the machine direction (MD) and the crystal orientation in the transverse direction (TD) in the trunk 4 is less than 44%. Note that the machine direction of the crystal orientation in the trunk 4 refers to the vertical direction in the FIGURE, and the transverse direction refers to a direction extending along the circumferential direction of the trunk 4.

With the above configuration, even when the content liquid heated to the predetermined temperature is hot-filled, the cap is fitted to the mouth 2, and subsequently the reduced pressure is generated within the synthetic resin container 1 due to the cooling process in which the content liquid is cooled for example to room temperature, the synthetic resin container 1 absorbs the reduced pressure by the reduced pressure absorbing panels 6 and also sufficiently reduces the deformation of the trunk 4 under the reduced pressure that is caused by the hot filling of the content liquid by the trunk 4 resisting the reduced pressure with its own strength.

The aforementioned density of the trunk 4 is measured based on the density gradient column method according to JIS K 7112. The crystal orientation of the trunk 4 is obtained by cutting out the trunk 4 as a specimen and calculating the crystal orientation based on the rate of absorbance of in-plane bending vibration of a benzene ring in a PET molecular chain observed at around 1410 cm$^{-1}$ and the rate of absorbance of wagging vibration of CH$^2$ observed at around 1340 cm$^{-1}$ of IR spectrum measured by the polarized ATR FT-IR method. Note that the crystal orientation is an average of a value measured from the inner surface side of the specimen and a value measured from the outer surface side of the specimen.

The density of the trunk 4 and the ratio of the crystal orientation in the transverse direction with respect to the total value of the crystal orientation in the machine direction and the crystal orientation in the transverse direction in the trunk 4 may be set to the aforementioned ranges by altering conditions, such as the shape of the preform, draw ratios of the preform by blow molding in the machine and transverse directions, the heating temperature of the preform, the temperature of the liquid supplied, the temperature of the mold, and a blow time period, in various ways.

Examples

To verify the effect of the present disclosure, 11 types of synthetic resin containers Nos. 1 to 11, which were formed by liquid blow molding into a bottle with a volume of 500 ml, the same volume as the synthetic resin container of FIG. 1, and which had different densities of the trunks and also had different crystal orientations in the machine direction and different crystal orientations in the transverse direction in the trunks, were prepared. For each synthetic resin container, the presence of deformation of the trunk under a reduced pressure that was caused by hot filling of a content liquid was assessed. Each synthetic resin container was formed of polyethylene terephthalate, and the temperature of the liquid filled to the preform during liquid blow molding was 85° C. It was after a cap was fitted to the mouth after liquid blow molding and subsequently the synthetic resin container was cooled to room temperature, that the presence of deformation of the trunk under the reduced pressure was assessed.

The deformation of the trunk was assessed by measuring outer diameter dimensions of the trunk in three directions that were shifted in the circumferential direction at an equal interval with use of a measurement device such as a caliper and by determining a difference between the maximum value and the minimum value of the outer diameter dimensions of the trunk in these three dimensions as an ellipticity. When the ellipticity was less than 5% of an average value of the outer diameter dimensions of the trunk in the aforementioned three directions, the deformation of the trunk was assessed as favorable by determining that the deformation of the trunk was reduced sufficiently. When the ellipticity was 5% or more of the average value of the outer diameter dimensions of the trunk in the aforementioned three directions, the deformation of the trunk was assessed as unfavorable by determining that the deformation of the trunk was not reduced sufficiently. Additionally, in the present Examples, the outer diameter dimensions at three positions of the trunk were measured at columnar portions located between adjacent reduced pressure absorbing panels. Table 1 shows results of the assessment.

TABLE 1

| No. | Density of trunk (g/cm³) | Crystal orientation of trunk (Inner-outer average) MD | Crystal orientation of trunk (Inner-outer average) TD | Ratio of crystal orientation of trunk (%) MD | Ratio of crystal orientation of trunk (%) TD | Deformation of trunk |
|---|---|---|---|---|---|---|
| 1 | 1.3681 | 1.171 | 0.796 | 59.53 | 40.47 | Unfavorable |
| 2 | 1.3708 | 1.171 | 0.805 | 59.26 | 40.74 | Favorable |
| 3 | 1.3708 | 1.237 | 0.871 | 58.68 | 41.32 | Favorable |
| 4 | 1.3705 | 1.156 | 0.878 | 56.83 | 43.17 | Favorable |
| 5 | 1.3705 | 1.091 | 0.864 | 55.81 | 44.19 | Unfavorable |
| 6 | 1.3703 | 1.184 | 0.770 | 60.59 | 39.41 | Favorable |
| 7 | 1.3695 | 1.145 | 0.820 | 58.27 | 41.73 | Favorable |
| 8 | 1.3697 | 1.148 | 0.833 | 57.95 | 42.05 | Favorable |
| 9 | 1.3705 | 1.139 | 0.879 | 56.44 | 43.56 | Favorable |
| 10 | 1.3711 | 1.206 | 0.889 | 57.57 | 42.43 | Favorable |
| 11 | 1.3725 | 1.312 | 0.834 | 61.14 | 38.86 | Favorable |

As indicated by Table 1, the synthetic resin containers (i.e., containers of Examples) Nos. 2 to 4 and 6 to 11 according to the present disclosure, in each of which the density of the trunk was 1.3695 g/cm³ or more and the ratio of the crystal orientation in the transverse direction (TD) with respect to the total value of the crystal orientation in the machine direction (MD) and the crystal orientation in the transverse direction (TD) in the trunk was less than 44%, underwent small amounts of deformation of the trunk and were assessed as favorable.

In contrast, the synthetic resin container (i.e., container of Comparative Example) No. 1, in which the density of the trunk was 1.3681 g/cm³, that is, less than 1.3695 g/cm³, and the synthetic resin container (i.e., container according to Comparative Example) No. 5, in which the ratio of the crystal orientation in the transverse direction (TD) with respect to the total value of the crystal orientation in the machine direction (machine direction: MD) and the crystal orientation in the transverse direction (TD) in the trunk was 44.19%, that is, 44% or more, underwent large amounts of deformation and were assessed as unfavorable.

From the above results, it has been confirmed that the deformation of the trunk that is caused by hot filling of the content liquid is reduced sufficiently by setting the density of the trunk to be 1.3695 g/cm³ or more and by setting the ratio of the crystal orientation in the transverse direction with respect to the total value of the crystal orientation in the machine direction and the crystal orientation in the transverse direction in the trunk to be less than 44% as in the synthetic resin containers according to the present disclosure.

Needless to say, the present disclosure is not limited to the configurations described in the above embodiments, and various changes may be made without departing the gist thereof.

For example, although in the above embodiments the synthetic resin container 1 according to the present disclosure is illustrated to have the shape of FIG. 1, the synthetic resin container 1 only needs to have a bottle shape having the mouth 2 and the trunk 4, and the shape, volume, and dimension of the synthetic resin container 1 may be altered in various ways.

Furthermore, although in the above embodiments the synthetic resin container 1 according to the present disclosure is formed of polyethylene terephthalate, the present disclosure is not limited to the embodiments, and the synthetic resin container 1 may be formed of another synthetic resin material.

Moreover, in some cases, it is conceivable that the configuration of the synthetic resin container 1 according to the present disclosure may be applied to a synthetic resin container formed by air blow molding.

REFERENCE SIGNS LIST

1 Synthetic resin container
2 Mouth
2a Screw thread
3 Shoulder
4 Trunk
5 Bottom
6 Reduced pressure absorbing panel
7 Upper annular concave rib
8 Lower annular concave rib
9 Neck ring

The invention claimed is:
1. A synthetic resin container that is formed in a bottle shape having a mouth, a trunk and a bottom, where the trunk has at least one reduced pressure absorbing panel and the bottom closes a lower end of the trunk, wherein the trunk has a density of 1.3695 g/cm³ or more, and the trunk has a crystal orientation A in a transverse direction and a crystal orientation B in a machine direction, wherein a ratio of the crystal orientation A with respect to a total value of the crystal orientation A+B in the trunk is less than 44%.

2. The synthetic resin container of claim 1, wherein the trunk has a substantially circular section.

3. The synthetic resin container of claim 2, wherein the at least one reduced pressure absorbing panel provided in the trunk comprises six reduced pressure absorbing panels arranged in a circumferential direction at an equal interval.

4. The synthetic resin container of claim 3, wherein the synthetic resin container is formed of polyethylene terephthalate.

5. A method for manufacturing the synthetic resin container of claim 4, the method comprising supplying a liquid heated to a predetermined temperature to a preform formed of a thermoplastic material in a bottomed tubular shape at a predetermined pressure to liquid blow mold the preform.

6. A method for manufacturing the synthetic resin container of claim 3, the method comprising supplying a liquid heated to a predetermined temperature to a preform formed of a thermoplastic material in a bottomed tubular shape at a predetermined pressure to liquid blow mold the preform.

7. The synthetic resin container of claim 2, wherein the synthetic resin container is formed of polyethylene terephthalate.

8. A method for manufacturing the synthetic resin container of claim 7, the method comprising supplying a liquid heated to a predetermined temperature to a preform formed of a thermoplastic material in a bottomed tubular shape at a predetermined pressure to liquid blow mold the preform.

9. A method for manufacturing the synthetic resin container of claim 2, the method comprising supplying a liquid heated to a predetermined temperature to a preform formed of a thermoplastic material in a bottomed tubular shape at a predetermined pressure to liquid blow mold the preform.

10. The synthetic resin container of claim 1, wherein the at least one reduced pressure absorbing panel provided in the trunk comprises six reduced pressure absorbing panels arranged in a circumferential direction at an equal interval.

11. The synthetic resin container of claim 10, wherein the synthetic resin container is formed of polyethylene terephthalate.

12. A method for manufacturing the synthetic resin container of claim 11, the method comprising supplying a liquid heated to a predetermined temperature to a preform formed of a thermoplastic material in a bottomed tubular shape at a predetermined pressure to liquid blow mold the preform.

13. A method for manufacturing the synthetic resin container of claim 10, the method comprising supplying a liquid heated to a predetermined temperature to a preform formed of a thermoplastic material in a bottomed tubular shape at a predetermined pressure to liquid blow mold the preform.

14. The synthetic resin container of claim 1, wherein the synthetic resin container is formed of polyethylene terephthalate.

15. A method for manufacturing the synthetic resin container of claim 14, the method comprising supplying a liquid heated to a predetermined temperature to a preform formed of a thermoplastic material in a bottomed tubular shape at a predetermined pressure to liquid blow mold the preform.

16. A method for manufacturing the synthetic resin container of claim 1, the method comprising supplying a liquid heated to a predetermined temperature to a preform formed of a thermoplastic material in a bottomed tubular shape at a predetermined pressure to liquid blow mold the preform.

17. A synthetic resin container that is formed in a bottle shape having a mouth, a trunk, two lower annular concave ribs and a bottom, where the trunk has at least one reduced pressure absorbing panel and between the trunk and the bottom, the two lower annular concave ribs are arranged vertically side by side to reinforce the trunk; wherein the trunk has a density of 1.3695 g/cm³ or more, and the trunk has a crystal orientation A in a transverse direction and a crystal orientation B in a machine direction, wherein a ratio of the crystal orientation A with respect to a total value of the crystal orientation A+B in the trunk is less than 44%.

* * * * *